United States Patent [19]

Baird et al.

[11] Patent Number: 4,590,805

[45] Date of Patent: May 27, 1986

[54] ULTRASONIC IMPELLER FLOWMETER

[75] Inventors: James D. Baird, Naperville; Brad D. Baird, Winfield, both of Ill.

[73] Assignee: Baird Controls, Inc., Naperville, Ill.

[21] Appl. No.: 665,051

[22] Filed: Oct. 26, 1984

[51] Int. Cl.[4] ............................................. G01F 1/06
[52] U.S. Cl. ............................ 73/861.87; 73/861.77
[58] Field of Search ............... 73/198, 202, 201, 187, 73/861.18, 861.77, 861.79, 861.89, 861.92; 324/160, 166

[56] References Cited

U.S. PATENT DOCUMENTS

| | | | |
|---|---|---|---|
| 3,457,782 | 7/1969 | Maeder et al. | 73/187 |
| 3,575,050 | 4/1971 | Lynnworth . | |
| 3,715,709 | 2/1973 | Zacharias, Jr. et al. . | |
| 3,735,637 | 5/1973 | Penet | 73/861.77 X |
| 3,981,194 | 9/1976 | Blise et al. . | |
| 4,088,022 | 5/1978 | Kalotay . | |
| 4,111,043 | 9/1978 | Guthrie et al. | 73/861.79 X |
| 4,114,440 | 9/1978 | Stapler | 73/861.92 |
| 4,173,144 | 11/1979 | Pounder . | |
| 4,195,522 | 4/1980 | Anderson et al. . | |
| 4,348,906 | 9/1982 | Feller . | |
| 4,379,411 | 4/1983 | Laviand et al. | 73/861.87 X |
| 4,417,480 | 11/1983 | Zacharias, Jr. . | |
| 4,433,583 | 2/1984 | Kirk . | |
| 4,440,030 | 4/1984 | Pounder et al. . | |
| 4,462,264 | 7/1984 | Feller | 73/861.78 |

FOREIGN PATENT DOCUMENTS 2028436 3/1980 United Kingdom ............. 73/861.87

Primary Examiner—Charles A. Ruehl
Attorney, Agent, or Firm—Emrich & Dithmar

[57] ABSTRACT

An ultrasonic impeller flowmeter for measuring fluid flow through a conduit includes a paddle wheel impeller rotatably mounted in a cylindrical protective housing which extends radially into the conduit through an aperture therein. A diametrical slot through the distal end of the housing admits fluid to rotate the paddle wheel. Ultrasonic transducers are embedded in the housing on opposite sides of the paddle wheel for establishing an ultrasonic carrier signal. Circumferentially spaced-apart openings in the paddle wheel modulate the ultrasonic signal to produce an output signal which is applied to detection and indicating circuitry. The depth of insertion of the housing and paddle wheel into the conduit is adjustable.

15 Claims, 5 Drawing Figures

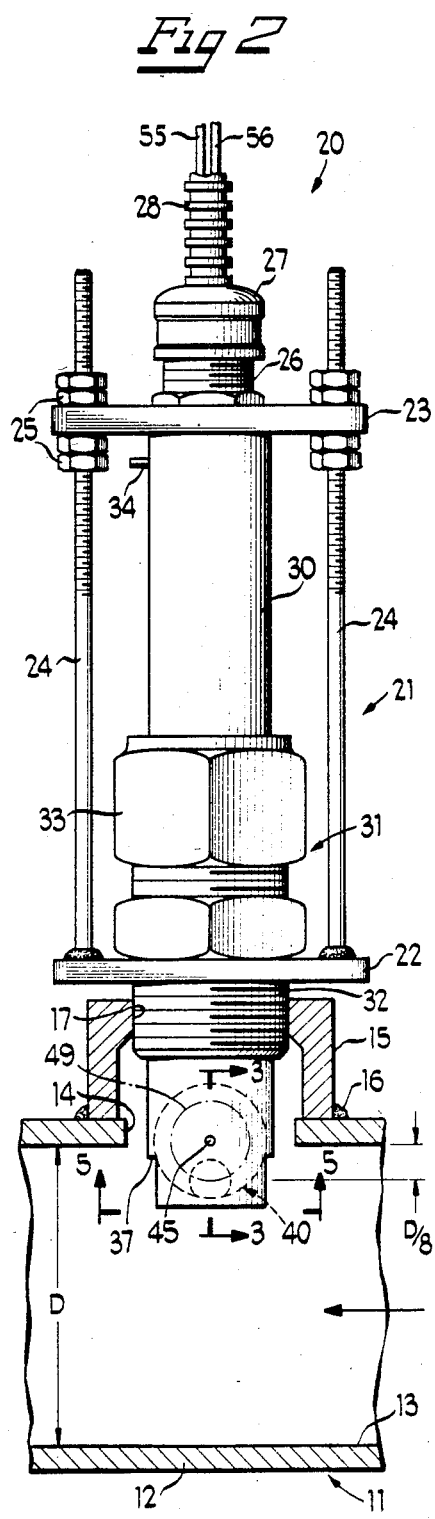
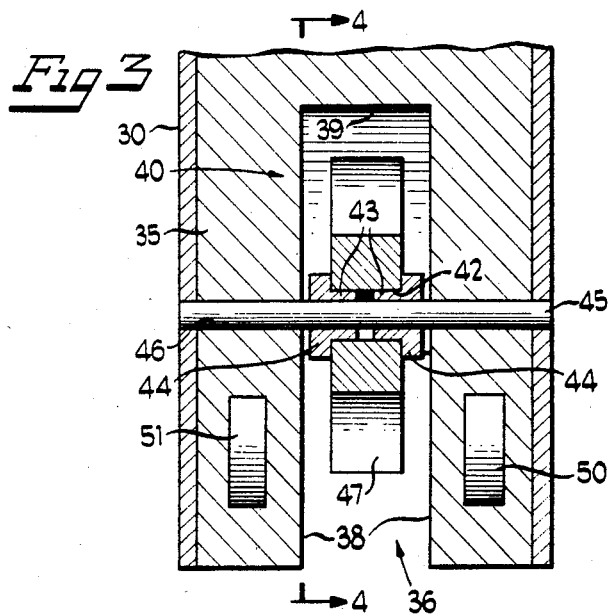
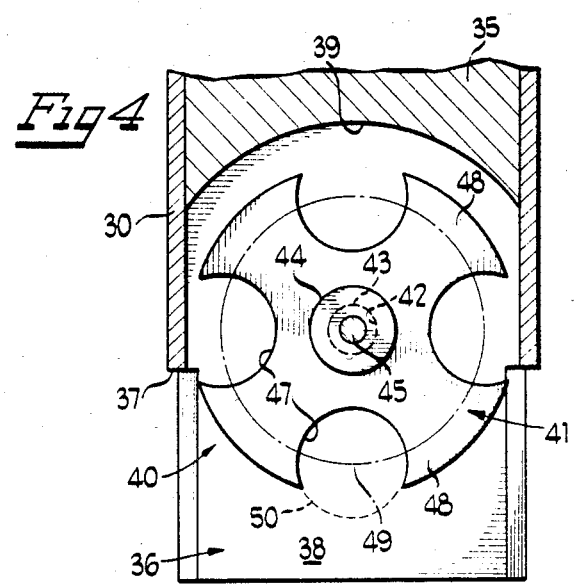
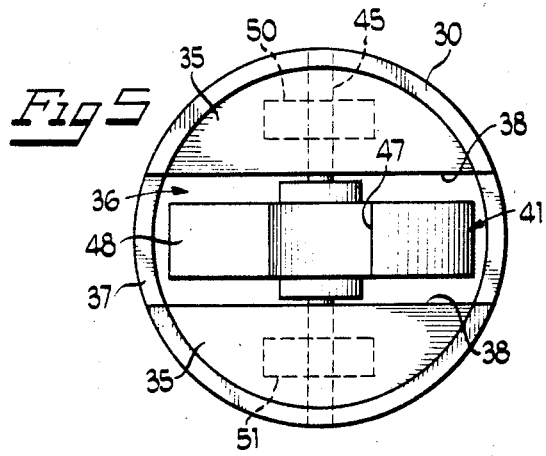

ULTRASONIC IMPELLER FLOWMETER

BACKGROUND OF THE INVENTION

The present invention relates to devices for measuring the flow of fluid through conduits. In particular, the present invention relates to instruments of the type generally referred to as flowmeters.

Such flowmeters may be of either (1) the noninvasive type, which do not interrupt the fluid flow, but rather establish a field or signal within the conduit which is varied in response to the fluid flow, or (2) the invasive type in which an element is disposed in the flow path for measuring the fluid flow. The present invention relates to the latter invasive type of flowmeter and, in particular, to a flowmeter of the type which utilizes an impeller which is rotated by the fluid at a rate which is proportional to the fluid velocity in the conduit.

Many types of impeller flowmeters are known, most being of the turbine type which utilize a rotating turbine mounted coaxially in the conduit. Such turbine flowmeters, however, do not operate well in anything except clean fluids, since any type of particulate matter in the fluid tends to clog the turbine or impair the free rotation thereof, resulting in inaccurate measurements. Furthermore, the turbine is subject to considerable wear and damage, since it is completely exposed at all times to the fluid and any particles or objects which may be carried therein.

It is known to use paddle wheel type impellers which project laterally into the fluid stream, and this alleviates the clogging problem and permits the use of this type of impeller with fluids other than completely clean fluids. However, prior paddle wheel impellers are still subject to considerable mechanical damage.

Furthermore, most prior impeller type flowmeters utilize magnetic or optical pickups to sense the rotational speed of the impeller. Such magnetic pickups create a drag on the impeller, thereby affecting the accuracy of the readings obtained. They also collect rust particles which tend to clog the apparatus. Optical pickups have the disadvantage of being usable only in clear fluids. They will not work, e.g., in frothy or foamy liquids.

Finally, prior paddle wheel flowmeters are mounted in special housings which must be inserted as a separate section in the fluid conduit and which necessitate changing the direction of fluid flow.

SUMMARY OF THE INVENTION

It is a general object of the present invention to provide an improved impeller type flowmeter which avoids the disadvantages of prior flowmeters while affording additional structural and operating advantages.

An important object of the invention is the provision of an impeller-type flowmeter which protects the impeller from excessive wear and damage by objects carried in the fluid being measured.

In connection with the foregoing object, it is another object of this invention to provide a flowmeter of the type set forth, wherein the impeller is disposed in a protective housing.

Yet another object of the invention is the provision of an impeller type flowmeter wherein the rotation detection device does not impose a drag on the impeller.

It is another object of the invention to provide an impeller flowmeter which can be used in all types of fluids in which immersed rotating members can be used.

In connection with the foregoing objects, it is another object of the invention to provide a flowmeter of the type set forth which utilizes a ultrasonic rotation detection means.

Another object of the invention is to provide a flowmeter which permits the use of probes of very small size.

These an other objects of the invention are attained by providing a flowmeter for measuring fluid flow along a flow path through a conduit having an aperture therein, the flowmeter comprising: a housing carried by the conduit and projecting through the aperture into the flow path in the conduit, a circular impeller rotatably mounted in the housing with no part of the impeller extending beyond the housing, the housing having an opening therein disposed for alignment with the flow path to permit the flow of fluid therethrough to engage and rotate the impeller at a speed proportional to the rate of flow of fluid through the conduit, and detection means coupled to the impeller for providing an indication of the speed of rotation of the impeller.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 2 is a fragmentary, side elevational view of the probe assembly of the flowmeter of the present invention, shown mounted in position on a conduit;

FIG. 3 is an enlarged, fragmentary view in vertical section taken along the line 3—3 in FIG. 2;

FIG. 4 is a fragmentary view in vertical section taken along the line 4—4 in FIG. 3; and FIG. 5 is an enlarged, end elevational view of the probe assembly of the present invention, taken generally along the line 5—5 in FIG. 2.

DESCRIPTION OF THE PREFERRED EMBODIMENT

Figure 1:
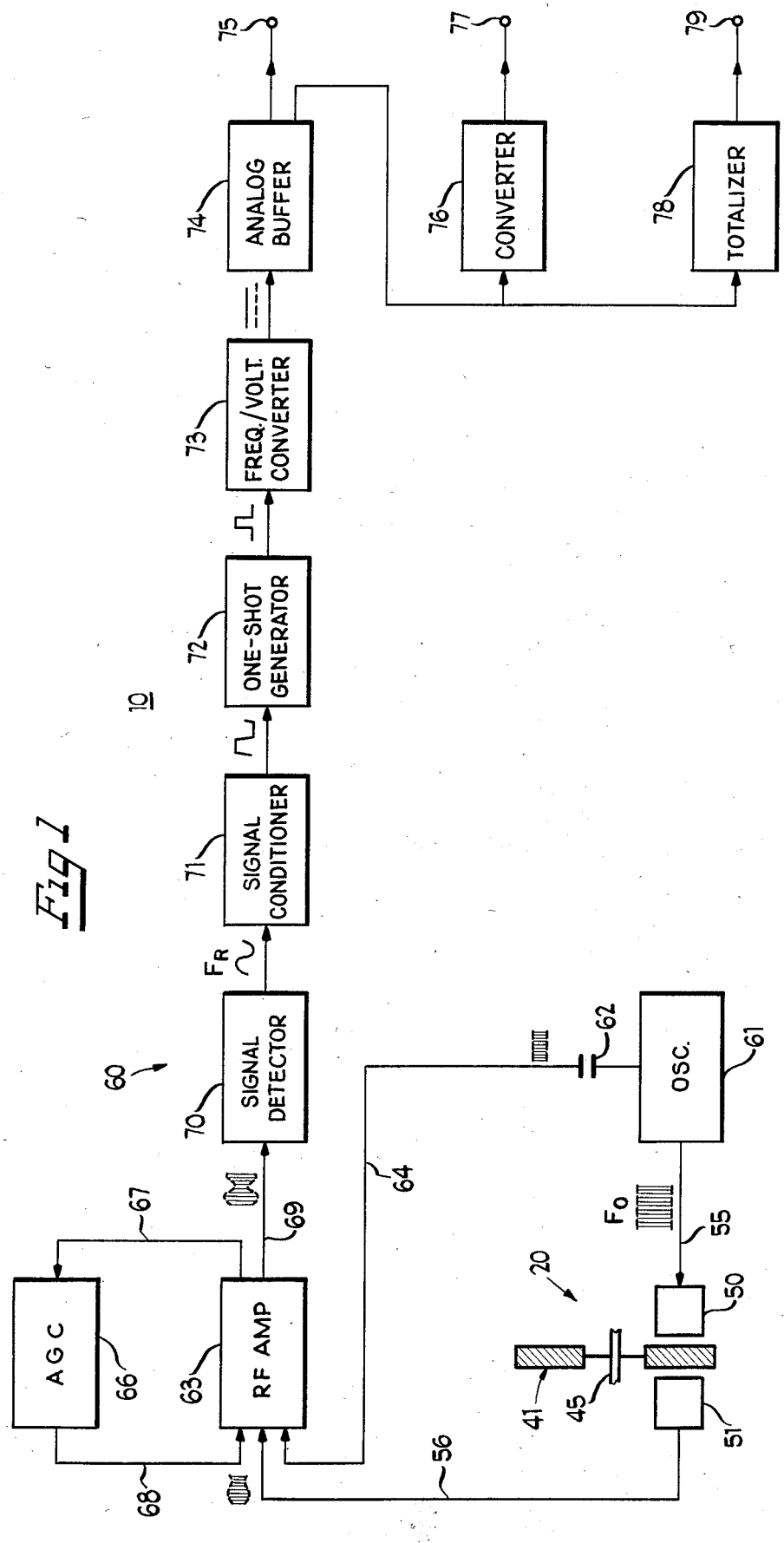
FIG. 1 is a block diagram of the present invention, including detection and indicating circuitry therefor.

Referring to FIG. 1, there is illustrated a flowmeter, generally designated by the numeral 10, constructed in accordance with and embodying the features of the present invention. Referring also to FIG. 2, the flowmeter 10 is adapted for measuring the flow of fluids through a conduit, such as a conduit 11 which includes a cylindrical wall 12 having a cylindrical inner surface 13. The flowmeter 10 is of the invasive type in which a probe is inserted into the stream of fluid flowing through the conduit 11. In this regard, the conduit 11 is provided with a circular aperture 14 in the wall 12. Mounted on the outer surface of the wall 12 in surrounding relationship with the aperture 14 is a generally cup-shaped coupling bracket 15, which may be secured by a weldment 16, and which is provided in its end wall with an internally threaded circular opening 17.

The flowmeter 10 includes a probe assembly 20 which is coupled to detection and indicating circuitry 60. The probe assembly 20 includes a safety cage 21 having spaced-apart, substantially, parallel inner and outer plates 22 and 23 interconnected by connecting rods 24. More specifically, the connecting rods 24 are preferably fixedly secured to the inner plate 22 and have the distal ends thereof externally threaded and received through complementary openings in the outer plate 23, being secured in place with respect thereto by nuts 25. Carried by the outer plate 23 and projecting outwardly therefrom is a male coupling 26 adapted for threaded engagement with a female coupling 27, which is in turn coaxially connected to a flexible conduit 28 which leads to the detection and indicating circuitry 60.

The probe assembly 20 also includes an elongated, tubular protective housing 30 which has one end thereof fixedly secured to the outer plate 23 for coaxial communication with the coupling 26. The lower end of the housing 30 extends coaxially through a compression seal assembly 31, which is in turn received through a complementary opening in the inner plate 22. The compression seal assembly 31 is of conventional construction, having an externally threaded cylindrical body 32 which extends through the opening in the inner plate 22 and is threadedly engaged in the opening 17 in the coupling bracket 15. Associated with the threaded body 32 are ferrules (not shown), the housing 30 extending through the ferrules and the threaded body 32. A compression nut 33 is threadedly engaged with the threaded body 32, securely to clamp the ferrules against the housing 30, effectively to prevent leakage around the housing 30.

In use, the housing 30 projects inwardly through the coupling bracket 15 and the aperture 14 in the conduit wall 12, substantially radially of the conduit 11, into the fluid flowing through the conduit 11. Typically, the fluid is a liquid, flowing through the conduit 11 in the direction indicated by the arrow in FIG. 2. This flow direction can be indicated by a direction lug 34 carried by the housing 30, the housing 30 being rotated before tightening of the compression seal assembly 31, so that the lug 34 points in the direction of fluid flow.

It will be appreciated that the compression seal assembly 31 permits the housing 30 to be moved radially of the conduit 11 to vary the depth of insertion therein, this radial movement being accommodated by the threaded coupling afforded by the connecting rods 24 and the nuts 25. When the housing 30 has been radially moved to its desired depth of insertion, the compression nut 33 is tightened, and the nuts 25 are tightened against the outer plate 23 to lock the housing 30 in place with respect to the safety cage 21.

Referring now also to FIGS. 3–5, the housing 30, or at least the inner end thereof, is filled with a filler 35, suitably bonded to the inner surface of the housing 30. Formed in the distal end of the housing 30 and the filler 35, and extending diametrically thereacross is a slot or channel 36 which terminates at an end edge 37 on the housing 30 and defines spaced-apart parallel side surfaces 38 in the filler 35. The channel 36 extends axially into the filler 35 well beyond the end edge 37, terminating at an inner arcuate end surface 39.

Mounted in the slot 36 is an impeller assembly, generally designated by the numeral 40, which includes a solid cylindrical paddle wheel 41 having an axial bore 42 therethrough. Respectively received in the axial bore 42 from the opposite sides of the paddle wheel 41 are two cylindrical bearings 43, each having an annular flange 44 which bears against the adjacent outer surface of the paddle wheel 41 for limiting the depth of insertion of the bearings 43. Received coaxially through the bearings 43 is an elongated shaft 45, the opposite ends of which are respectively received in a complementary bore 46 which extends diametrically through the housing 30 and the filler 35, being fixedly secured to the housing 30.

The paddle wheel 41 has four part-cylindrical notches 47 formed in the outer cylindrical surface thereof and extending laterally therethrough, the notches 47 being equiangularly spaced apart and alternating with lands 48. The centers of the notches 47 lie on a common circle 49 which is coaxial with the paddle wheel 41.

It will be appreciated that the paddle 41 is freely rotatable on the bearings 43 about the axis of the shaft 45. Thus, in use, the fluid flowing through the conduit 11 passes through the slot or channel 36 and engages the notches 47 in the paddle wheel 41 for rotating the paddle wheel 41 at a speed which is proportional to the flow velocity of the fluid in the conduit 11. It is a significant feature of the present invention that the mounting of the probe assembly 20 directly in the side of the conduit 11 requires no disassembly of the conduit 11 or change of direction of the fluid flow.

Embedded in the filler 35, as by being molded in place therein, are two cylindrical ultrasonic transducers 50 and 51, respectively disposed on opposite sides of the slot or channel 36. The transducers 50 and 51 are preferably piezoelectric crystals, such as lead zirconate crystals, resonant at an ultrasonic frequency, such as 1 Mhz. Preferably, the transducers 50 and 51 have diameters substantially equal to the diameters of the notches 47 in the paddle wheel 41, and are arranged to be substantially coaxial with one of those notches 47 when it is disposed centrally of the housing 30 at the position closest to the distal end thereof, as illustrated in FIGS. 3 and 4. Coaxial cables 55 and 56 are respectively connected to the transducers 50 and 51 and extend upwardly through the filler 35, and thence through the conduit 28 to the detection and indicating circuitry 60, as will be explained in greater detail below.

In use, the transducers 50 and 51 cooperate with the detection and indicating circuitry 60 to establish a beam of ultrasonic energy therebetween generally coaxial therewith, which beam is passed by the notches 47 of the paddle wheel 41, and is blocked or interrupted by the lands 48 thereof.

Referring now in particular to FIG. 1, the detection and indicating circuitry 60 includes a 1 Mhz. oscillator 61 which is coupled by the coaxial cable 55 to the ultrasonic transducer 50, and is also coupled through a capacitor 62 and a conductor 64 to one input of a radio frequency (RF) amplifier 63. Another input of the amplifier 63 is connected by the coaxial cable 56 to the other transducer 51. The amplifier 63 has an output which is connected by a conductor 67 to the input of an automatic gain control (AGC) circuit 66, the output of which is fed back to another input of the amplifier 63 by a conductor 68.

In use, the oscillator 61 applies a 1 Mhz. carrier signal to the transducer 50, which establishes a 1 Mhz. ($F_1$) carrier beam of ultrasonic energy which is coupled through the fluid in the conduit 11 to the transducer 51. As the paddle wheel 41 rotates, it repeatedly interrupts the beam of ultrasonic energy, thereby modulating the 1 Mhz. ultrasonic carrier signal with a frequency $F_R$ which corresponds to four times the frequency of rotation of the paddle wheel 41. Thus, it will be appreciated that the transducer 51 produces an output signal $F_O$ which is proportional to $F_1 + F_R$, which output signal is applied to an input of the RF amplifier 63. A fraction of the output of the oscillator 61 is also coupled to the RF amplifier 63 through the coupling capacitor 62 to control the operation of the automatic gain control circuit 66.

The output of the RF amplifier 63 is also applied by a conductor 69 to the input of a signal detector 70, which essentially demodulates the amplified output signal $F_O$ and extracts the modulation envelope signal $F_R$ therefrom. This detected signal is then applied to a signal conditioner 71 which squares up the signal waveform, this shaped signal in turn being applied to a one shot generator 72 to produce a square wave pulse at the leading edge of each pulse of the shaped signal. This pulsating signal is then applied to a frequency/voltage converter 73 to produce an output voltage level proportional to the frequency of the incoming pulse signal. This voltage signal is applied to an analog buffer 74, the output of which is fed to an output terminal 75 for application to an associated local indicator, such as a meter.

Preferably, the output of the analog buffer 74 is a 0-1 ma signal. This signal, is in turn, applied to a converter 76 for converting it to a 4-20 ma signal, suitable for driving a transmitter which may be coupled to an output terminal 77 for transmitting the output signal to a remote indicator. The output from the analog buffer 74 may also be applied to the input of a totalizer 78, the output of which is applied to an output terminal 79 which may be coupled to an associated indicating counter.

The signals at the output terminals 75 and 77 are directly proportional to the speed of rotation of the paddle wheel 41 and, therefore, to the velocity of fluid flow through the conduit 11. The output signal from the totalizer 78, on the other hand, is proportional to the total gallonage flowing past the paddle wheel 41 from the time that the flowmeter 10 is turned on to the time it is turned off. The total flow per unit of time is equal to the flow rate times a constant corresponding to the cross-sectional area of the conduit 11.

In overall operation of the flowmeter 10, the probe assembly 20 is first mounted in place on the conduit 11, with the housing 30 being positioned at a predetermined depth of insertion into the conduit 11. It has been experimentally determined that the optimum depth of insertion is such that the innermost point of the center circle 49 of the notches 47 is spaced radially from the inner surface 13 in the conduit wall 12 a distance approximately equal to D/8, where D is the inner diameter of the conduit 11. This is substantially at the mean velocity point of the fluid flowing through the conduit 11.

It is a significant aspect of the present invention that no part of the paddle wheel 41 projects outwardly beyond the housing 30. This serves effectively to protect the paddle wheel 41 from mechanical damage by objects carried in the fluid flowing in the conduit 11. Thus, the housing 30 is arranged so that the axis of the shaft 45 is perpendicular to the direction of flow of the fluid through the conduit 11. Accordingly, the paddle wheel 41 is effectively protected from lateral forces. The slot or channel 36 admits sufficient fluid flow for rotation of the paddle wheel 41, but is narrow enough to prevent large particulate matter and debris in the fluid stream from contacting the paddle wheel 41.

When the probe assembly 20 has been mounted in position at the proper insertion depth, the detection and indicating circuitry 60 is turned on. The ultrasonic energy generated by the transducer 50 is acoustically coupled to the transducer 51 through the fluid, this coupling being interrupted by the lands 48 of the paddle wheel 41 as it rotates through the beam of ultrasonic energy for modulation thereof. Because the detection and indicating circuitry 60 is ultrasonically operated, there is no magnetic drag on the paddle wheel 41.

It will be appreciated that the flowmeter 10 can be used with conduits 11 formed of any material, without concern as to the magnetic permeability of the materials used. Furthermore, the moving parts of the probe assembly 20, which are preferably formed of nonmagnetic materials, do not collect metallic or rust particles that cause problems with magnetic types of devices. Also, the flowmeter 10 is not limited to use with clear or clean liquids. Additionally, the high-frequency ultrasonic beam affords a highly linear and repeatable output, and use of this ultrasonic technique also allows the reduction of the probe diameter, thereby reducing cost and allowing operation in smaller diameter conduits than is possible with conventional devices.

In a constructional model of the present invention, the probe assembly 20 is preferably formed of materials which are corrosion resistant. The housing 30 may be formed of stainless steel or suitable nonmetallic materials. The filler 35 is formed of an electrically insulating material which transmits sound waves, such as an epoxy material. The paddle wheel 41 may be formed of a polyvinylidene fluoride material, such as that sold by Pennwalt Corp. under the trademark "KYNAR". The bearings 43 may be formed of a glass-filled polytetrafluoroethylene material, such as that sold by Dixon Industries, Corp. under the trademark "RULON".

From the foregoing, it can be seen that there has been provided an improved flowmeter of the impeller type which is of relatively simple and economical construction, effectively protects the impeller from damage while affording a free rotation thereof, affords accurate and repeatable measurements, can be used in any type of fluid in which an immersed rotating member can be used, and which can be inserted directly in an existing conduit without requiring alteration of the direction of the fluid flow.

We claim:

1. A flowmeter for measuring fluid flow along a flow path through a conduit having an aperture therein, said flowmeter comprising: a housing carried by the conduit and projecting through the aperture into the flow path in the conduit, a circular impeller mounted in said housing for rotation about an axis inclined with respect to the fluid flow path with no part of said impeller extending beyond said housing, said housing having a parallel-sided opening therethrough disposed for alignment with the flow path to permit the flow of fluid therethrough without substantially changing the rate of fluid flow to engage and rotate said impeller at a speed proportional to the rate of flow of fluid through the conduit, the detection means coupled to said impeller for providing an indication of the speed of rotation of said impeller.

2. The flowmeter of claim 1, wherein said housing is cylindrical in shape.

3. The flowmeter of claim 2, wherein said housing projects substantially radially into the conduit.

4. The flowmeter of claim 3, wherein said opening comprises a slot extending diametrically across the distal end of said housing.

5. The flowmeter of claim 1, wherein said impeller is disposed so that the region of engagement thereof with the fluid is spaced inwardly of the conduit a distance approximately ⅛ the inner diameter of the conduit.

6. The flowmeter of claim 1, and further including means for varying the depth of insertion of said housing and said impeller into the conduit.

7. The flowmeter of claim 1, wherein said detection means includes ultrasonic means.

8. An ultrasonic flowmeter for measuring fluid flow along a flow path through a conduit having an aperture therein, said flowmeter comprising: a housing carried by the conduit and projecting through the aperture into the flow path in the conduit, a circular paddle wheel mounted in said housing for rotation about an axis inclined with respect to the fluid flow path with no part of said paddle wheel extending beyond said housing, said housing having a parallel-sided opening therethrough disposed for alignment with the flow path to permit the flow of fluid therethrough without substantially changing the rate of fluid flow to engage and rotate said paddle wheel at a speed proportional to the rate of flow of fluid through the conduit, ultrasonic transducer means for establishing an ultrasonic carrier signal acoustically coupled to said paddle wheel by the fluid, said paddle wheel including means for modulating said carrier signal as a function of the speed of rotation of said paddle wheel to produce an output signal, and indicating means coupled to said transducer means and responsive to said output signal for producing an indication representative of the rate of flow of fluid through the conduit.

9. The flowmeter of claim 8, wherein said housing is cylindrical in shape.

10. The flowmeter of claim 9, wherein said paddle wheel extends substantially radially into the conduit with the axis of rotation thereof disposed substantially perpendicular to the flow path.

11. The flowmeter of claim 8, wherein said modulating means includes a plurality of openings through said paddle wheel equiangularly spaced apart circumferentially thereof and separated by a plurality of lands, said transducer means establishing a beam of ultrasonic energy, said openings accommodating passage of said beam and said lands interrupting said beam.

12. The flowmeter of claim 11, wherein said transducer means includes two transducers respectively disposed on opposite sides of said paddle wheel and embedded in said housing.

13. The flowmeter of claim 11, wherein said paddle wheel is disposed so that the region of engagement thereof with the fluid is spaced from the conduit a distance substantially equal to ⅛ the inner diameter of the conduit.

14. An ultrasonic flowmeter for measuring fluid flow through a conduit, said flowmeter comprising: paddle wheel means supported by the conduit for rotation by the fluid flowing therethrough about an axis inclined with respect to the direction of fluid flow at a speed proportional to the rate of fluid flow, ultrasonic transducer means for establishing a beam of ultrasonic energy including an ultrasonic energy signal acoustically coupled to said paddle wheel means by the fluid, said beam of ultrasonic energy extending substantially parallel to the axis of rotation of said paddle wheel means, said paddle wheel means including means for modulating said carrier signal as a function of the speed of rotation of said paddle wheel means to produce an output signal, and indicating means coupled to said transducer means and responsive to said output signal for producing an indication representative of the rate of flow of fluid through the conduit.

15. The flowmeter of claim 14, wherein the conduit has an aperture therein, said paddle wheel extending through said aperture.

* * * * *

UNITED STATES PATENT AND TRADEMARK OFFICE
CERTIFICATE OF CORRECTION

PATENT NO. : 4,590,805
DATED : May 27, 1986
INVENTOR(S) : James D. Baird, et al.

It is certified that error appears in the above—identified patent and that said Letters Patent are hereby corrected as shown below:

Column 6, claim 1, line 66, change "the" to --and--.

Signed and Sealed this

Ninth Day of September 1986

[SEAL]

Attest:

DONALD J. QUIGG

Attesting Officer

Commissioner of Patents and Trademarks